United States Patent [19]

Jewell et al.

[11] Patent Number: 4,828,698

[45] Date of Patent: May 9, 1989

[54] FILTERING APPARATUS

[75] Inventors: James E. Jewell, Centerport, N.Y.;
Evan E. Koslow, Westport, Conn.

[73] Assignee: Pall Corporation, Glen Cove, N.Y.

[21] Appl. No.: 213,481

[22] Filed: Jun. 30, 1988

Related U.S. Application Data

[63] Continuation of Ser. No. 126,502, Nov. 30, 1987, abandoned, which is a continuation of Ser. No. 837,167, Mar. 7, 1986, abandoned.

[51] Int. Cl.$^4$ .................... B01D 13/00; B01D 15/00
[52] U.S. Cl. .................................. 210/266; 210/282;
210/321.86; 210/493.5
[58] Field of Search ............... 210/266, 282, 287, 484,
210/493.5, 497.01, 501, 502.1, 503–505, 510.1,
321.86, 321.87

[56]           References Cited

U.S. PATENT DOCUMENTS

| | | | |
|---|---|---|---|
| 2,171,201 | 8/1939 | Urbain et al. | 210/2 |
| 3,250,397 | 5/1966 | Moltchan | 210/409 |
| 3,252,270 | 5/1966 | Pall et al. | 55/74 |
| 3,327,859 | 6/1967 | Pall | 210/266 |
| 3,701,433 | 10/1972 | Krakauer et al. | 210/436 |
| 3,733,267 | 5/1973 | Haase | 210/27 |
| 3,950,251 | 4/1976 | Hiller | 210/287 |
| 3,985,648 | 10/1976 | Casolo | 210/27 |
| 4,025,438 | 5/1977 | Gelman et al. | 210/484 |
| 4,026,792 | 5/1977 | Orth, Jr. | 210/27 |
| 4,104,170 | 8/1978 | Nedza | 210/487 |
| 4,126,559 | 11/1978 | Cooper | 210/445 |
| 4,183,811 | 1/1980 | Walch et al. | 210/23 |
| 4,540,489 | 9/1985 | Barnard | 210/287 |

FOREIGN PATENT DOCUMENTS

| | | |
|---|---|---|
| 0159698 | 4/1985 | European Pat. Off. . |
| 0150559 | 8/1985 | European Pat. Off. . |
| 2118777 | 4/1971 | Fed. Rep. of Germany . |
| 2346035 | 3/1977 | France . |
| 1140850 | 1/1969 | United Kingdom . |
| 1265089 | 3/1972 | United Kingdom . |
| 1499347 | 2/1978 | United Kingdom . |

OTHER PUBLICATIONS

"Consumers Digest", Feb. 1984, pp. 40–41 & 57.

Primary Examiner—Ivars Cintins
Attorney, Agent, or Firm—Leydig, Voit & Mayer

[57]         ABSTRACT

The disclosure describes a filter assembly comprising a housing having a liquid inlet and a liquid outlet and defining a liquid flow path between the inlet and the outlet; a generally cylindrical filter arrangement disposed within the housing in the liquid flow path and comprising a cylindrically shaped porous means for removing particulate contaminants from the liquid, a cylindrically shaped sorbent-containing means for removing chemical contaminants from the liquid, and a cylindrically shaped microporous means for removing microbiological contaminants from the liquid; and means for directing the liquid flow radially through the filter arrangement.

15 Claims, 2 Drawing Sheets

FILTERING APPARATUS

This application is a continuation Ser. No. 126,502 filed Nov. 30, 1987, which is a continuation of application Ser. No. 837,167 filed Mar. 7, 1986, both now abandoned.

TECHNICAL FIELD

The present invention relates to filters. In particular, it relates to an apparatus for filtering a broad spectrum of contaminants from a liquid.

DISCLOSURE OF THE INVENTION

Liquids, such as water, may contain many different kinds of contaminants including, for example, particulates, harmful chemicals, and microbiological organisms such as pathogenic bacteria, amoeba, flagellate, and viruses. In a variety of circumstances, these contaminants must be removed before the liquid can be used. For example, in many medical applications and in the manufacture of certain electronic components, extremely pure water is required. As a more common example, any harmful and observable contaminants must be removed from water before it is potable, i.e., fit to drink.

Ideally, a filtering apparatus for removing this broad spectrum of contaminants would comprise a single, small, lightweight, self-contained device rather than a complex multicomponent and/or multistage system to remove the various contaminants. Such a device would not only be more reliable than a complex system, but it would also be far more portable. Thus, it could be carried into very primitive environments, for instance, during backpacking, to provide a supply of potable water.

In a preferred design, the filtering apparatus should present a low resistance to the flow of liquid through the apparatus so that in a remote environment, where the electricity necessary to drive a pump may be unavailable, the filtering apparatus may simply be connected between upper and lower containers of water, for example, between a container of water hanging from a tree and a container of water resting on the ground. The filtering apparatus should also have sufficient internal structural integrity to withstand even greater pressures if, for example, a hand pump or other source of pressure is available to drive the liquid through the filtering apparatus. Further, the filtering apparatus should include a prefilter portion which is able to remove substantial quantities of gross contaminants without becoming completely clogged so that a considerable amount of purified liquid can be obtained.

A general object of the present invention is to provide an improved apparatus for filtering contaminants from a liquid. Specific objects include providing a filtering apparatus which removes a broad spectrum of contaminants from a liquid, which is highly portable and reliable, which presents a low resistance to the flow of liquid through the apparatus, and which removes the contaminants from a substantial volume of liquid before becoming clogged.

Accordingly, the present invention may be embodied in a filter assembly comprising a housing containing a generally cylindrical filter arrangement. The housing has a liquid inlet and a liquid outlet and defines a liquid flow path between the inlet and outlet. The filter arrangement is disposed within the housing in the liquid flow path and comprises a cylindrically shaped porous structure for removing particulate contaminants from the liquid, a cylindrically shaped structure containing a sorbent material (i.e., a material which absorbs or adsorbs certain substances) for removing chemical contaminants from the liquid, and a cylindrically shaped microporous structure for removing microbiological contaminants from the liquid. The structure for removing microbiological contaminants is disposed downstream from the other two structures. The filtering apparatus also includes impervious end members mounted to the ends of the filter arrangement, one of the end members having a central aperture. These end members direct liquid flow radially through the filter arrangement.

A filter assembly embodying the present invention may feature, for example, a cylindrically shaped, particulate removing structure which may be fashioned from a variety of suitable materials and which has a graded porosity where the size of the pores increases or decreases along the radius of the structure.

Further, a filter assembly embodying the present invention may feature a sorbent containing structure in which the sorbent material is immobilized. The sorbent material may be immobilized either by a polymeric binder such as powdered polyethylene, by entrapment in a microfibrous web of various materials including, for example, polymeric microfibers of polypropylene, cellulose, or nylon, or by a combination of physically restraining materials. Preferably, the sorbent containing structure contains a sufficient quantity of sorbent material and the flow velocity through the sorbent material is sufficiently low to allow an adequate contact or resident time between the sorbent material and the chemical contaminants which are to be sorbed by the sorbent material. Since different chemical contaminants have different sorbent kinetics and different sorbent materials have different sorption capacities, the sorbent containing structure may also be fashioned from a variety of suitable materials including, for example, activated carbon, activated alumina, molecular sieve, or ion exchange resins.

A filter assembly embodying the present invention may also feature, for example, a microbiological contaminant removing structure comprising a microporous polymeric membrane. Such a membrane may preferably have an absolute pore rating of 0.2 micron or less and may be fashioned, e.g., from nylon or a fluorinated polymer.

BEST MODE FOR CARRYING OUT THE INVENTION

Figure 1:
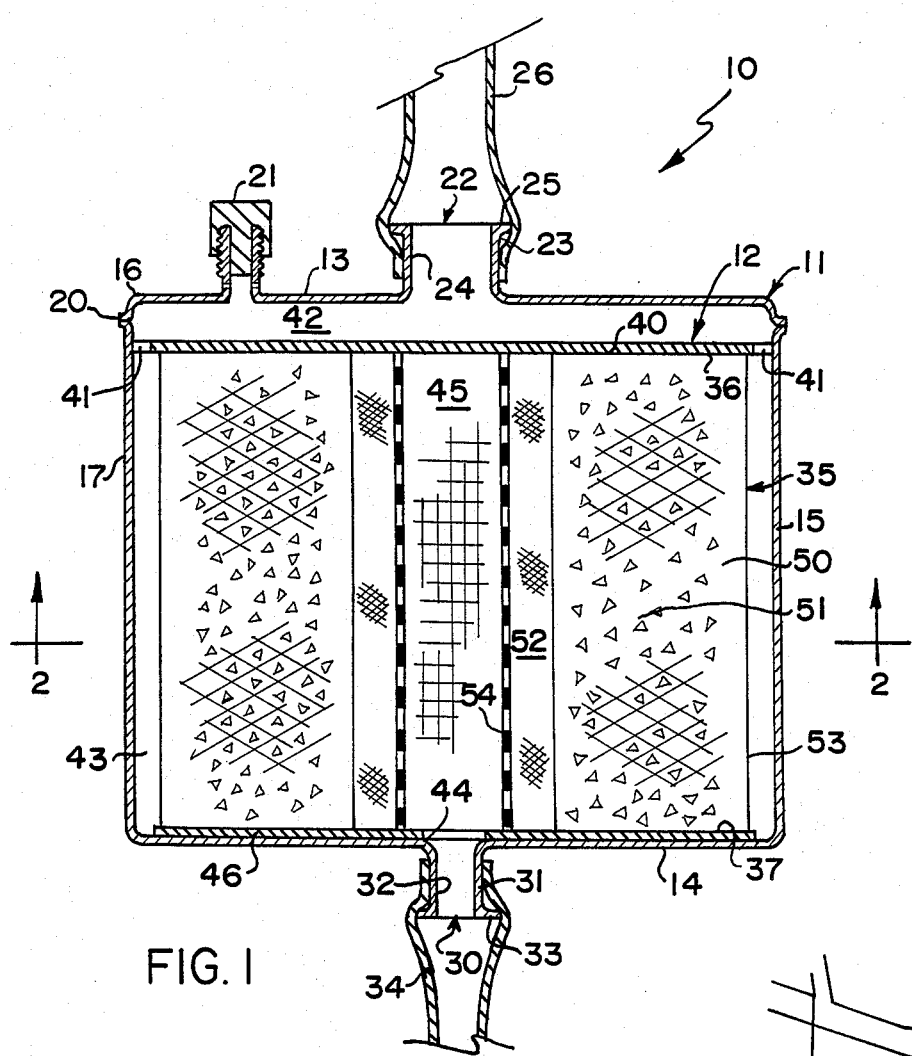
FIG. 1 is a sectional side view of an exemplary filtering apparatus embodying the present invention.
Figure 2:
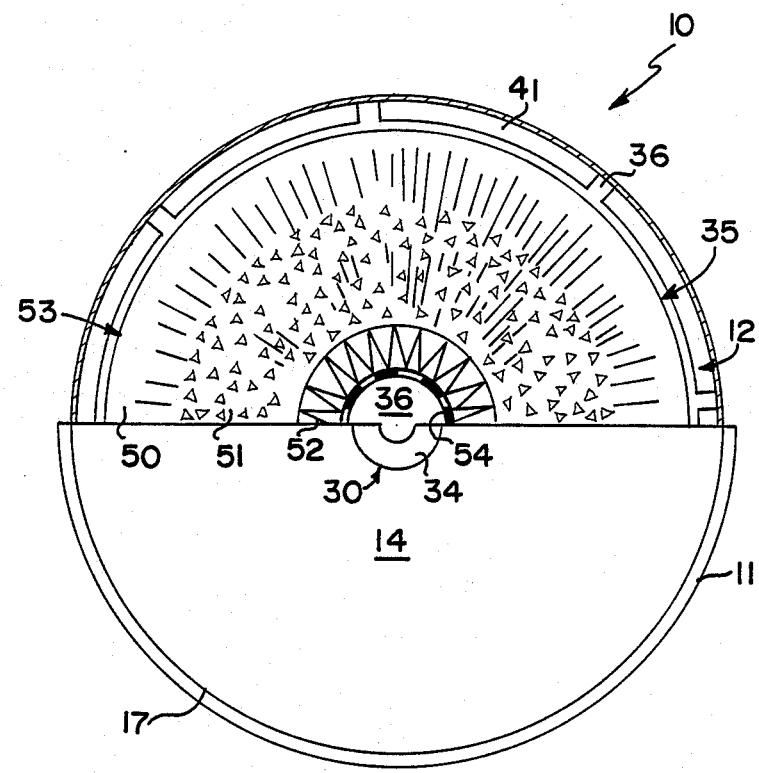
FIG. 2 is a partial sectional end view of the filtering apparatus of FIG. 1 as viewed along lines 2—2.

As shown in FIGS. 1 and 2, an exemplary filter cartridge 10 embodying the present invention comprises a generally cylindrical housing 11 and a cylindrical filter arrangement 12 disposed within the housing 11. The filter cartridge 10 purifies liquids, e.g., water, containing a broad spectrum of contaminants including, for example, solid particulates including radioactive isotopes, certain polyvalent dissolved salts, toxic organic chemcials such as many pesticides, and microbiological contaminants such as bacteria, amoeba or flagellates.

The housing 11 is preferably fabricated from polypropylene, although it may be fabricated from any sufficiently rigid material, including other polymers or sheet metal. In the preferred embodiment, the housing 11 has a top wall 13, a bottom wall 14 and a cylindrical side wall 15 and comprises an upper portion 16 and a lower portion 17 joined to one another at a circumferential joint 20. The top wall 13 of the housing 11 includes an air-bleed valve 21 and an inlet 22. The inlet 22 comprises a coaxially projecting cylindrical protrusion 23 with a coaxial hole 24 and a flange 25 which facilitates connecting the inlet 22 to a supply line 26. Similarly, the bottom wall 14 of the housing 11 has an outlet 30 comprising a coaxially projecting cylindrical protrusion 31 with a coaxial hole 32 and a flange 33 which facilitates connecting the outlet 30 to a drain line 34. Alternatively, the cylindrical protrusions 23, 31 of the inlet 22 and the outlet 30 may have threaded portions rather than flanges 25, 33 to facilitate connection of the supply line 26 and the drain line 34.

The filter arrangement 12 comprises a cylindrical filter assembly 35 disposed between top and bottom end caps 36, 37 which direct liquid radially through the filter assembly 35. The end caps 36, 37 also lend axial and radial support to the filter assembly 35. In the preferred embodiment, both the top and bottom end caps 36, 37 are fabricated from polypropylene. However, they can be fabricated from any sufficiently impervious material, including other polymers.

The top end cap 36 comprises a circular disc having a diameter equal to the inside diameter of the side wall 15. It is preferably disposed coaxially within the housing 11 a short distance from and parallel to the top wall 13 and is joined to the side wall 15. While the top end cap 36 completely encloses the top end 40 of the filter assembly 35, it includes peripheral perforations 41 which allow liquid to flow between the upper space 42, i.e., the space between the top end cap 36 and the top wall 13 of the housing 11, and the annular space 43, i.e., the space between the exterior of the filter assembly 35 and the side wall 15 of the housing 11.

The bottom end cap 37 comprises a circular disc which, in the preferred embodiment, has a diameter smaller than the inside diameter of the side wall 15 of the housing 11 but at least equal to the outside diameter of the filter assembly 35. The bottom end cap 37 is disposed coaxially within the housing and is joined to the bottom wall 14. Except for a central hole 44 in the bottom end cap 37 which allows liquid to flow between a central space 45 in the filter assembly 35 and the outlet 30, the bottom end cap 37 completely encloses the bottom end 46 of the filter assembly 35.

In accordance with one aspect of the invention, the filter assembly 35 comprises a cylindrical filter 50 for removing particulate contaminants and a cylindrical sorbent bed 51 for removing chemical contaminants, both disposed upstream from a cylindrical filter 52 for removing pathogenic microbiological contaminants. The cylindrical geometry of the filter arrangement 12 minimizes the resistance to the flow of liquid through the filter cartridge 10 compared to comparably sized conventional axial flow filter cartridges capable of filtering such substances. Consequently, the filter cartridge 10 of the present invention provides reasonable flow rates even for a small pressure differential between the inlet 22 and outlet 30.

In a preferred embodiment, the particulate filter 50 and the sorbent bed 51 comprise distinct upstream and downstream regions, respectively, of a cylindrical, nonwoven, microfibrous filter element 53 composed of a fibrous mass of the type which is disclosed in the European Patent Application No. 84309094.5, published under Publication No. 0 148 638 on July 17, 1985. As disclosed in that application, the fibrous mass comprises a mass of nonwoven, synthetic polymeric microfibers (e.g., polypropylene microfibers) free of fiber-to-fiber bonding and maintained by mechanical entanglement or intertwining of the microfibers. As further disclosed this fibrous mass may be fabricated in a graded pore size configuration, i.e., a configuration having pore sizes which decrease progressively with decreasing radius of the cylindrical fibrous mass, or a constant pore size configuration and may have various additives or combinations of additives, such as activated carbon or ion exchange resins, interspersed in the fibrous mass.

In a preferred embodiment, the upstream region 50 of the microfibrous filter element 53 comprises a graded pore size configuration having, for example, an upstream absolute pore rating in the range from about 50 micrometers to about 150 micrometers and a downsteam absolute pore rating in the range from about 0.5 micrometer to about 5 micrometers. A graded pore size configuration is highly effective for removing certain microorganisms and other fine particulates while delaying the onset of clogging due to gross contamination components in the influent stream. The downstream region 51 of the microfibrous filter element 53 may comprise a microporous fiber matrix having a constant pore size configuration and containing particles of sorbent material, i.e., material which adsorbs or absorbs contaminants, such as activated carbon, reticulated water service resins, activated alumina, molecular sieve, ion exchange resins, and/or attapulgite clay for removing a broad spectrum of chemical contaminants. Particles in a wide variety of size ranges may be used, including particles in the size range of about $50 \times 100$ U.S. Sieve Series. Since the sorbent particles are bound, i.e., immobilized, within the fiber matrix of the filter element 53, settling and channeling of the sorbent bed due to shock or vibration are minimized or even precluded, enhancing both the reliability and the durability of the filter cartridge 10.

While the filter assembly 35 of the preferred embodiment of the filter cartridge 10 comprises distinct upstream and downstream regions 50, 51 of a single filter element 53, the filter assembly 35 could alternatively comprise any appropriately configured and suitably fashioned particulate filter and sorbent bed without departing from the scope of the invention. For example, the particulate filter and sorbent bed may be coextensive over the filter element 53 rather than comprised of distinct regions 50, 51. On the other hand, they may comprise entirely independent elements. Thus, the particulate filter may comprise, for example, a woven mesh of glass fibers or a pleated, porous nylon membrane while the sorbent bed may comprise a compressibly-loaded bed of loose sorbent particles or a binder-immobilized sorbent particle bed as described in European Patent Application No. 85104933.8, published under Publication No. 0 159 698 on Oct. 30, 1985, and European Patent Application No. 85305652.1, published under Publication No. 0172003 on Jan. 19, 1986.

In accordance with European Patent Application No. 85104933.8, the sorbent particle bed may comprise a bed of binder-immobilized sorbent particles in which sorbent particles, such as particles of activated carbon, are mixed with a suitable polymeric binding material, such as powdered polyethylene. The mixture is then heated and compressed to the solid-liquid transition stage of the binding material, yielding a binder-immobilized sorbent particle bed once the mixture cools. A similar process for immobilizing inorganic sorbent particles is disclosed in European Patent Application No. 85305652.1.

To remove microbiological contaminants, any suitable microporous polymeric membrane may be used, including membranes having certain surface charged properties. Preferably, these membranes have an absolute pore rating in the range from about 0.02 micrometer to about 0.5 micrometer. The downstream microbiological filter 52 of the exemplary filter assembly 35 preferably comprises a microporous membrane such as a surface-modified, hydrophilic, microporous polyamide membrane having an absolute pore rating of about 0.2 micrometer. This membrane is described in European Patent Application No. 83300518.4, published under Publication No. 0 090 483 on Oct. 5, 1983, and is available under the trademark Posidyne from Pall Corporation. As disclosed in that application, the membrane has a positive zeta potential in neutral or alkaline liquids, such as water. Consequently, the membrane is highly effective for removing both microbiological contaminants and certain ionic contaminants. The microbiological filter 52 may further comprise upstream and downstream support layers adjoining both sides of the membrane. The support layers may be fashioned from any suitable woven or nonwoven polymeric fibrous material, such as a nonwoven layer of polypropylene or polyester, terephthalate fibers.

The filter assembly 35 also comprises a cylindrical perforated core 54 disposed coaxially within the microbiological filter 52 for radially supporting the particulate filter 50, the sorbent bed 51, and the microbiological filter 52. The perforated core 54 is preferably fabricated from polypropylene, although it can be fabricated from many sufficiently rigid materials, including other polymers or sheet metal. In alternative embodiments, the filter assembly may further include a perforated cage disposed upstream from the particulate contaminant filter to support and protect the particulate contaminant filter and/or a midstream perforated core disposed between the sorbent bed and the microbiological filter to support the sorbent bed.

The filter cartridge 10 may be fabricated and assembled according to several known techniques. For example, the upper and lower portions 16, 17 of the housing 11, the top and bottom end caps 36, 37, and the perforated core 54 may be formed by injection molding, a well known technique for fabricating polymeric structures. The microfibrous filter element 53 and the microporous polyamide membrane may be fabricated according to the disclosures in the previously referenced European Patent Application Nos. 84309094.5 and 83300518.4, respectively. The membrane may then be disposed between the upstream and downstream support layers to form a composite and the composite may then be pleated and arranged in a cylindrical configuration in a conventional manner to form the microbiological filter 52. The microbiological filter 52 may then be disposed within the microfibrous filter element 53 and the perforated core 54 may be disposed within the pleated membrane 52, yielding the filter assembly 35.

The top and bottom ends 40, 46 of the filter assembly 35 may then be joined to the top and bottom end caps 36, 37, respectively, for example, by spinbonding, a well known technique for joining polymeric structures, or by heat-melt sealing, a technique disclosed in Pall et al, U.S. Pat. No. 3,457,339 yielding the filter arrangement 12. The bottom end cap 37 of the filter arrangement 12 may then be spunbound to the lower portion 17 of the housing 11, and the upper portion 16 of the housing 11 may be spunbound to both the lower portion 17 of the housing 11 and the periphery of the top end cap 36 without closing off the peripheral perforations 41.

Figure 3:
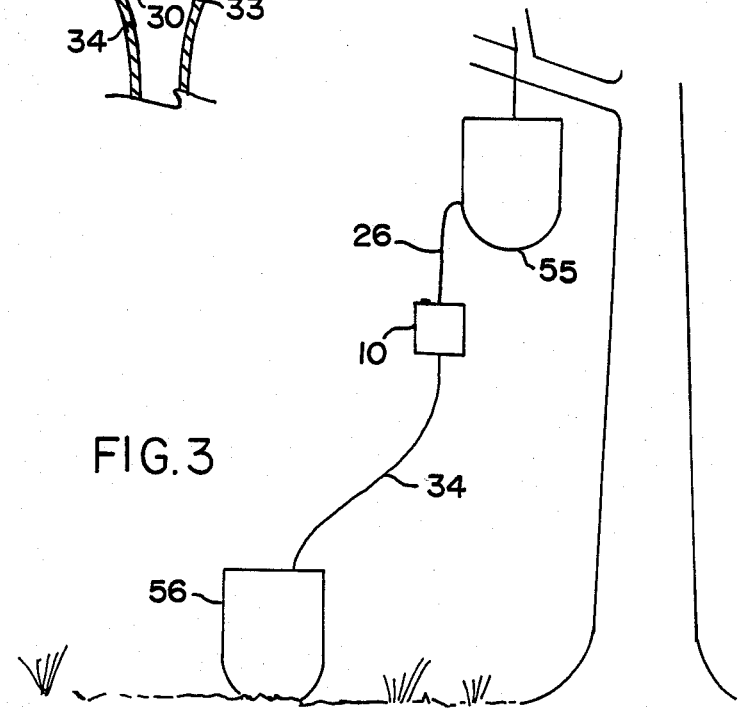
FIG. 3 is an illustration of a liquid filtering system incorporating the filtering apparatus of FIG. 1.

In one preferred mode of operation, the filter cartridge 10 is connected between an upper container 55 which contains a contaminated liquid, such as water, and a lower container 56 which stores purified water, as shown in FIG. 3. The water is fed by gravity from the upper container 55, along the supply line 26, and through the filter cartridge 10 where it is purified. The purified water is then fed along the drain line 34 and into the lower container 56. The cylindrical geometry of the filter arrangement 12 minimizes the resistance to the flow of water and, therefore, permits a reasonable flow rate, e.g., 500–2,000 ml/minute, using a small gravity head, e.g., a 27 inch water column. Alternatively, a pump may be installed in the supply or drain line 26, 34.

More specifically, the water flows from the upper container 55, down the supply line 26, through the coaxial hole 24 of the inlet 22, and into the upper space 42 of the filter cartridge 10. The water then flows through the peripheral perforations 41 in the top end cap 36 and into the annular space 43. To insure that the upper space 42 and annular space 43 fill with water and that all air escapes from the filter cartridge 10, the air-bleed valve 21 is opened until significant amounts of water begin escaping the filter cartridge 10 through the valve 21 and is then closed.

From the annular space 43 the water flows radially inwardly through the microfibrous filter element 53, passing first through the graded pore size upstream region 50, where particulates and certain organisms are removed, and next through the sorbent-containing downstream region 51, where chemical contaminants are removed. The water then flows radially inwardly through the pleated membrane 52, where microbiological contaminants and certain ionic contaminants are removed. From the pleated membrane 52, the purified water flows radially inwardly through the perforated core 54 and into the central space 45 of the filter assembly 35. From the central space 45, the purified water flows axially through the central hole 44 in the bottom end cap 37, through the coaxial hole 32 of the outlet 30, along the drain line 26 and into the storage reservoir 56.

Although the present invention has been described in terms of a particular embodiment, it is not limited to this embodiment. Alternative embodiments and modifications which would still be encompassed by the invention may be made by those skilled in the art, particularly in light of the foregoing teachings. Therefore, the following claims are intended to cover any alternative embodiments, modifications or equivalents which may be included within the spirit and scope of the invention as defined by the claims.

We claim:

1. A filter cartridge for removing contaminants from a liquid, said filter cartridge comprising a housing which has a top wall, a bottom wall, a generally cylindrical side wall extending between the top wall and the bottom wall, and an inlet and an outlet defining a liquid flow path through the housing and a hollow, generally cylindrical filter arrangement which is disposed within the housing in the liquid flow path and spaced from the side wall and which includes a cylindrically shaped porous means for removing particulate contaminants from the liquid, the particulate removing means comprising a microfibrous filter having an upstream portion and a downstream portion in which the upstream portion has a larger pore size than the downstream portion, a cylindrically shaped sorbent containing means disposed coaxially within and downstream from the particulate removing means for removing chemical contaminants from the liquid, the chemical contaminant removing means comprising a bed of immobilized sorbent particles, a cylindrically shaped microporous means disposed coaxially within and downstream from the chemical contaminant removing means for removing microbiological contaminants from the liquid, said microbiological contaminant removing means comprising a microporous membrane having an absolute pore rating in the range of from about 0.02 micrometer to about 0.5 micrometer and means for directing the liquid flow radially through the filter arrangement, said directing means including a first impervious end means sealingly engaging one end of the filter arrangement and a second impervious end means sealingly engaging the other end of the filter arrangement, said second end means including a central aperture means for allowing fluid to flow through the filter arrangement.

2. The filter cartridge of claim 1 wherein the microfibrous filter comprises a non-woven mass of polymeric microfibers.

3. The filter cartridge of claim 1 wherein the upstream portion has an absolute pore rating in the range from about 50 micrometers to about 100 micrometers and the downstream portion has an absolute pore rating in the range from about 0.5 micrometer to about 5 micrometers.

4. The filter cartridge of claim 1 wherein the bed of immobilized sorbent particles comprises a microfibrous mass interspersed with sorbent particles.

5. The filter cartridge of claim 1 wherein the bed of immobilized particles comprises a mixture of polymeric binding material and sorbent particles.

6. The apparatus of claim 5 wherein the sorbent particles comprise particles of activated carbon and the polymeric binding material comprises powdered polyethylene.

7. The filter cartridge of claim 1 wherein the particulate contaminant-removing means and the chemical contaminant-removing means comprise upstream and downstream regions, respectively, of a microfibrous mass, said downstream region comprising a bed of fiber-immobilized sorbent particles.

8. The filter cartridge of claim 1 wherein the porous membrane has a positive zeta potential in alkaline or neutral liquids.

9. A filter cartridge for removing contaminants from a liquid, said filter cartridge comprising a housing having a liquid inlet and a liquid outlet and defining a liquid flow path therebetween; a filter assembly disposed within the housing in the liquid flow path and comprising a cylindrically shaped microfibrous filter having an absolute pore rating at least within the range from about 0.5 micrometer to about 5 micrometers, said microfibrous filter communicating with the inlet, a cylindrically shaped bed of sorbent particles coaxially disposed within the microfibrous filter, and a cylindrically shaped microporous membrane coaxially disposed within the sorbent bed and having an absolute pore rating in the range from about 0.02 micrometer to about 0.5 micrometer; a first end cap enclosing a first end of the filter assembly; and a second end cap enclosing a second end of the filter assembly, said second end cap including a central aperture communicating with the outlet.

10. A filter arrangement for removing contaminants from a liquid flowing through the filter arrangement, said filter arrangement comprising a microfibrous filter having an upstream portion and a downstream portion, said upstream portion having a larger pore size than the downstream portion, a bed of immobilized sorbent particles disposed downstream from the microfibrous filter, and a pleated microporous membrane disposed downstream from the sorbent bed and having an absolute pore rating in the range from about 0.02 micrometer to about 0.5 micrometer.

11. The filter arrangement of claim 10 wherein the upstream portion of the microfibrous filter has an absolute pore rating in the range from about 50 micrometers to about 150 micrometers and the downstream portion has an absolute pore rating in the range from about 0.5 micrometer to about 5 micrometers.

12. The filter arrangement of claim 10 wherein the sorbent bed comprises a microfibrous filter interspersed with the sorbent particles.

13. The filter arrangement of claim 12 wherein the microfibrous filter having an upstream portion with a larger pore size than a downstream portion and the microfibrous filter interspersed with sorbent particles comprise distinct regions of a single microfibrous filter.

14. The filter arrangement of claim 10 wherein the porous membrane has a positive zeta potential in alkaline or neutral liquids.

15. A filter cartridge for removing particulate, chemical, and microbiological contaminants from raw water, the filter cartridge comprising a housing having a top wall, a bottom wall, and a generally cylindrical side wall extending therebetween, the top wall including an air bleed valve and an inlet and the bottom wall including an outlet, and a filter arrangement disposed adjacent the bottom wall and including a generally cylindrical filter assembly coaxially disposed within the housing and a top end cap enclosing the top end of the filter assembly, the filter assembly having a smaller diameter than the diameter of the side wall and the top end cap being mounted to the side wall spaced from and parallel to the top wall and including a plurality of peripheral apertures communicating between a first space between the top wall and the top end cap and a second space between the side wall and the filter assembly, the filter assembly comprising a generally cylindrical microfibrous filter including an upstream portion having an absolute pore rating in the range from about 50 micrometers to about 150 micrometers and a downstream portion having an absolute pore rating in the range from about 0.5 micrometer to about 5 micrometers, a generally cylindrical sorbent bed disposed coaxially within the microfibrous filter and including a microfibrous mass interspersed with sorbent particles, a generally cylindrical pleated microporous membrane coaxially disposed within the sorbent bed and having an absolute pore rating in the range from about 0.02 micrometer to about 0.5 micrometer and a positive zeta potential in alkaline or neutral liquids, and a hollow, cylindrical perforated core coaxially disposed within the pleated membrane, the interior of the core communicating with the outlet.

* * * * *